S. B. EDWARDS.
SPRING WHEEL.
APPLICATION FILED NOV. 7, 1911.
1,024,191.
Patented Apr. 23, 1912.
3 SHEETS—SHEET 1.
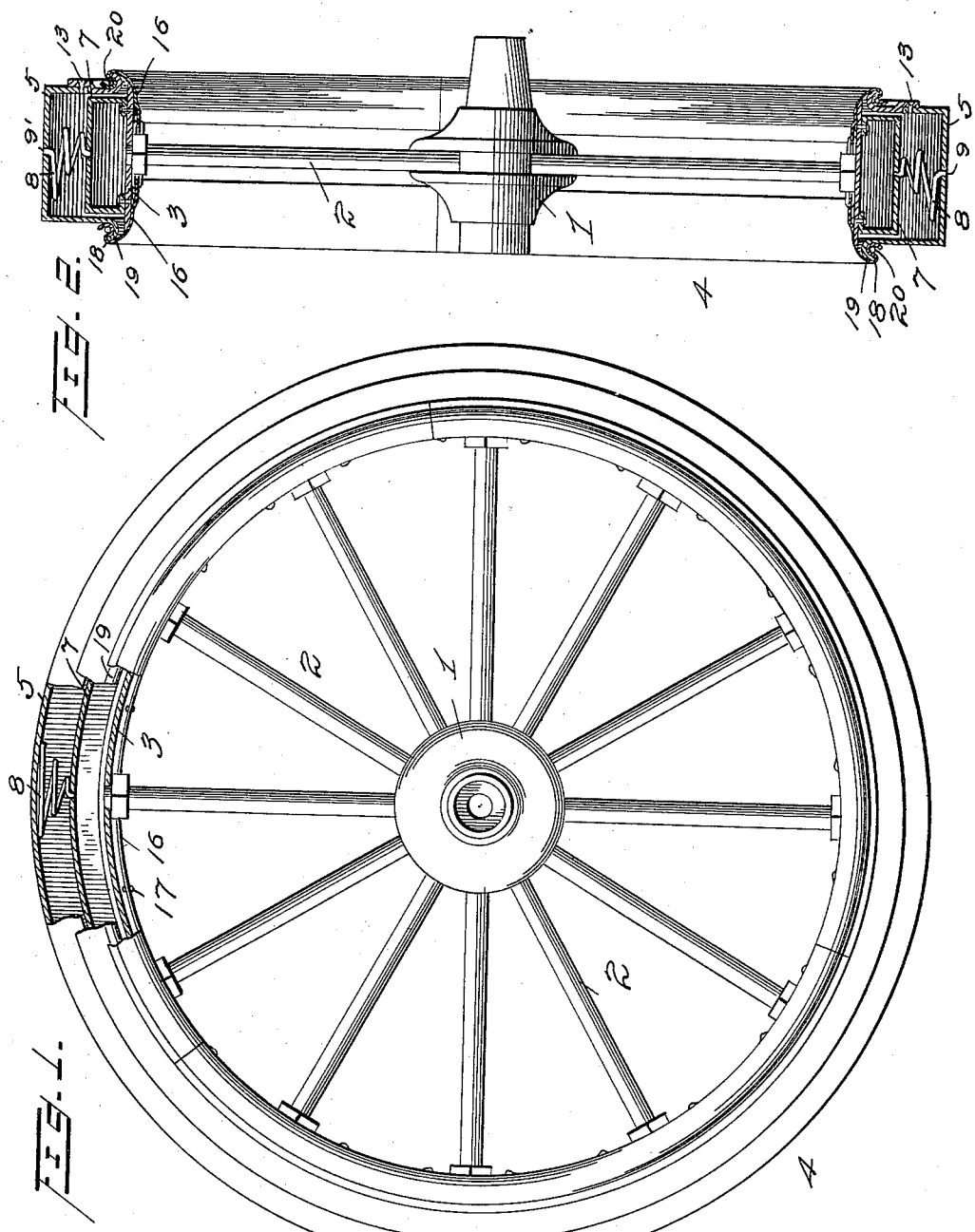
Witnesses
Inventor
Stillman B. Edwards
by
Attorneys

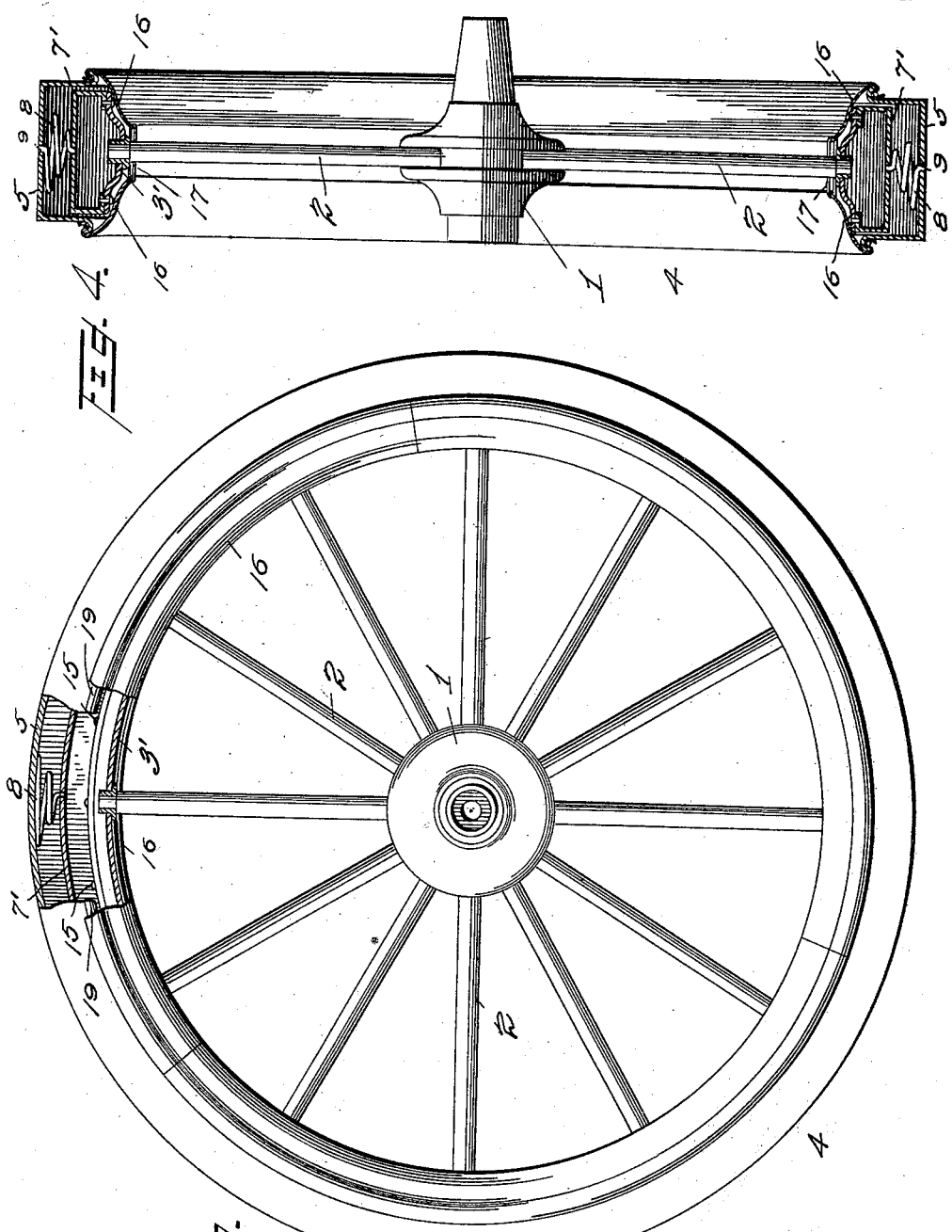

S. B. EDWARDS.
SPRING WHEEL.
APPLICATION FILED NOV. 7, 1911.
1,024,191.
Patented Apr. 23, 1912.
3 SHEETS—SHEET 3.
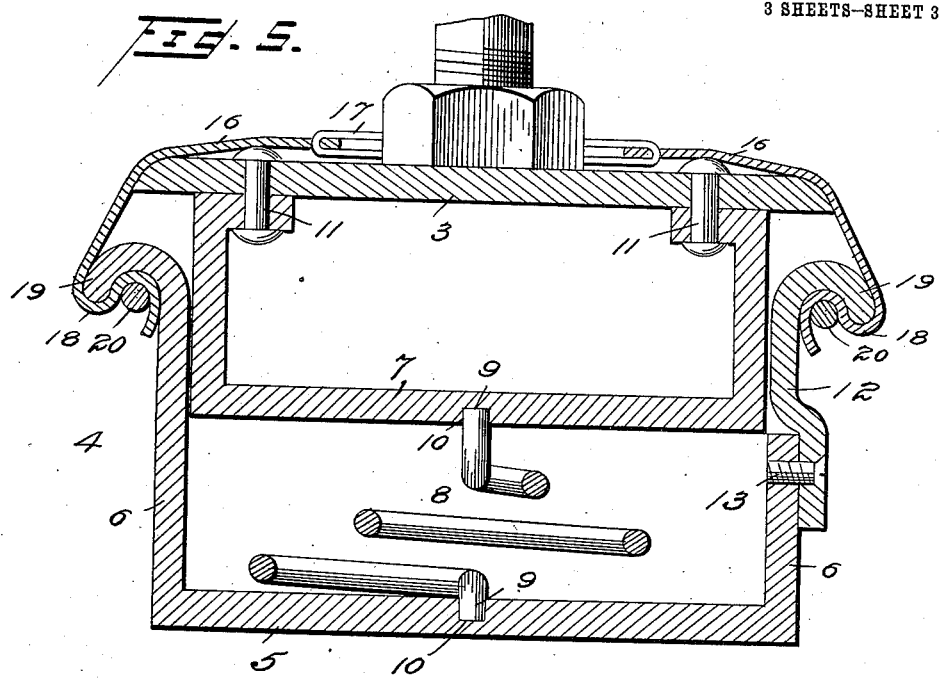
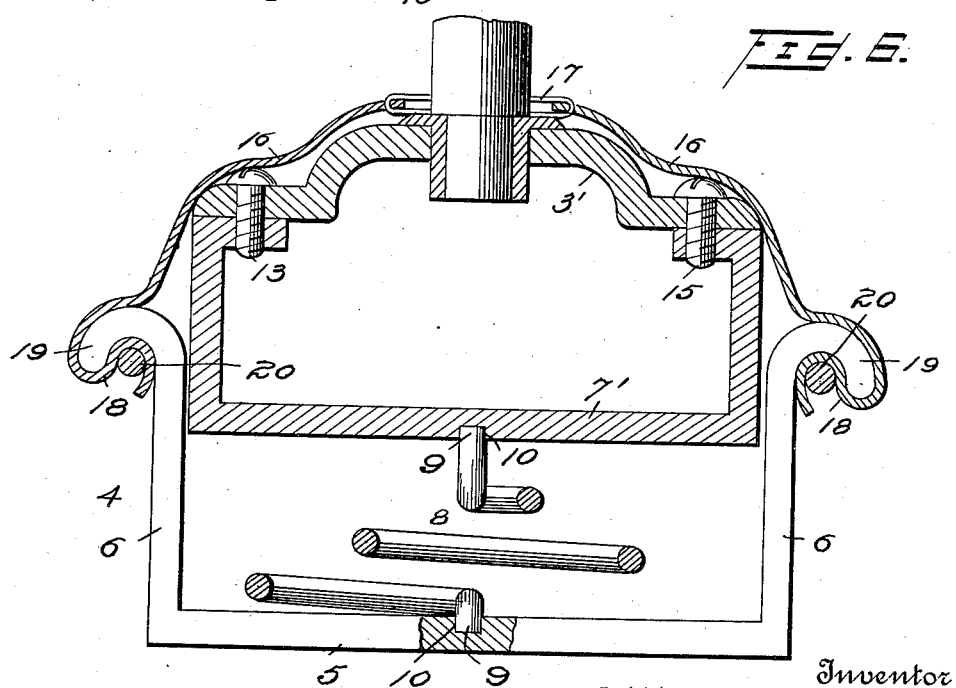
Witnesses
Inventor
Stillman B. Edwards
by
Attorneys

UNITED STATES PATENT OFFICE.

STILLMAN B. EDWARDS, OF VILLISCA, IOWA.

SPRING-WHEEL.

1,024,191.

Specification of Letters Patent.

Patented Apr. 23, 1912.

Application filed November 7, 1911. Serial No. 658,994.

*To all whom it may concern:*

Be it known that I, STILLMAN B. EDWARDS, a citizen of the United States, residing at Villisca, in the county of Montgomery and State of Iowa, have invented certain new and useful Improvements in Spring-Wheels, of which the following is a specification.

This invention relates to new and useful improvements in spring wheels, and has for its object to provide a wheel of this type wherein the several component parts may be readily assembled or disassembled, and which will afford approximately the same resiliency as a pneumatic tire.

With the foregoing and other objects in view, the invention consists in the novel features of construction, combination and arrangement of parts illustrated in the drawings and more particularly pointed out in the appended claim.

In the accompanying drawings:—Figure 1 is an elevation of a wheel embodying my improvements, a portion thereof being shown in section. Fig. 2 is a vertical transverse section of Fig. 1. Fig. 3 is an elevation of a modified form, a portion thereof being shown in section. Fig. 4 is a vertical transverse section, and Figs. 5 and 6 are transverse sectional views with the parts represented on an enlarged scale.

Referring to the drawings for a more particular description of the invention, 1 indicates the hub, 2 the spokes, 3 the rim and 4 the tire, consisting of the outer member 5, of approximately U shaped form in cross section, which is formed in one piece and is arranged with its side members or side walls 6, extending inwardly toward the center of the wheel. The tire further comprises an inner member 7, which fits within the outer member 5 and is attached to the rim 3 of the wheel. A series of coil springs 8, the coils of which are graduated in size, are disposed between the outer and inner members of the tire with the ends, as 9, of said coils fitting in corresponding sockets 10 in the outer and inner faces of said members. In the preferred construction, shown in Figs. 1, 2 and 5, the inner member of the tire is riveted by the rivets 11 to the rim of the wheel and one of the side walls 6 of the outer member provided with the removable section 12, fastened by screws 13 to the outer portion 14 of the outer member of the tire. In the modified construction, however, shown in Figs. 3, 4 and 6, the inner section or member 7' is made in three or more sections, which are fastened to the rim 3' by the screws 15. The two forms, while somewhat different in the features described, are such as to provide for the assembling or disassembling of the parts as occasion may necessitate.

The wheel rim and inner edges of the tire sections are preferably covered with strips of leather 16, the inner edges of which are secured to the spokes by suitable fastening means, as 17, and the outer edges 18 are folded in the outwardly bent flanges 19, formed at the inner edges of the side walls of the outer member of the tire and held in place by the wire rings 20.

From the foregoing description, taken in connection with the drawings, it is thought that the construction and advantages of this invention may be readily understood without requiring a more extended explanation.

Various changes in the form, proportions and minor details of construction may be resorted to without departing from the principles or sacrificing any of the advantages of this invention as defined in the appended claim.

Having described my invention, what I claim as new is:—

A vehicle wheel of the class described, comprising a rim, a tire consisting of an outer section of approximately U shaped form in cross section provided at the inner edges of its side walls with outwardly bent flanges, an inner section of less diameter than the outer section fitting within the latter and fastened to the rim of the wheel, strips of leather covering the edges of the rim and the inner edges of the tire sections with the outer edges of said strips folded in the flanges of the outer tire section, means for attaching the inner edges of the strips to the spokes of the wheel, clamping rings to hold the outer edges of the strips in the flanges of the outer tire section, and a series of circumferentially placed coil springs between the inner and outer tire sections, the coils of the several springs being graduated in size.

In testimony whereof I affix my signature in presence of two witnesses.

STILLMAN B. EDWARDS.

Witnesses:
J. H. HORTON,
S. M. COLEMAN.

Copies of this patent may be obtained for five cents each, by addressing the "Commissioner of Patents, Washington, D. C."